United States Patent [19]
Huff et al.

[11] 4,403,801
[45] Sep. 13, 1983

[54] CLAMP ASSEMBLY

[75] Inventors: Edward R. Huff, Washington; Hubert H. Warner, Pekin, both of Ill.

[73] Assignee: Caterpillar Tractor Co., Peoria, Ill.

[21] Appl. No.: 277,753

[22] PCT Filed: Feb. 24, 1981

[86] PCT No.: PCT/US81/00225
§ 371 Date: Feb. 24, 1981
§ 102(e) Date: Feb. 24, 1981

[87] PCT Pub. No.: WO82/02872
PCT Pub. Date: Sep. 2, 1982

[51] Int. Cl.³ .............................................. B66C 1/46
[52] U.S. Cl. ............................................... 294/93
[58] Field of Search ............... 294/93, 63 R, 63 A, 294/64 R, 65, 81, 86 R, 87 R, 88, 99 R; 414/4, 744 A, 735

[56] References Cited
U.S. PATENT DOCUMENTS 2,756,883 7/1956 Schreck ........................... 214/313
3,915,311 10/1975 Ball et al. ....................... 214/1 QD
4,273,505 6/1981 Clark et al. ...................... 294/93
4,285,537 8/1981 Hawrylo et al. ................ 294/93

Primary Examiner—James B. Marbert
Attorney, Agent, or Firm—Robert A. McFall

[57] ABSTRACT

A clamp assembly (12) is disclosed for controllably gripping an article (10). Automated material handling devices generally require sensor and control devices to adapt the device to variously sized and shaped articles. Also, the application of excess contact force between the clamping device and article may damage vulnerable surfaces and features of the article being handled. The present invention solves the above problem by providing a clamp assembly (12) having opposed, pressurizable gripping members (64,66). The gripping members (64,66) each have a compliant, article-contacting surface (67,68) which form about the article (10) upon pressurization of the gripping members (64,66). The invention is of particular benefit in handling a wide range of differently sized stepped-diameter shafts.

4 Claims, 5 Drawing Figures

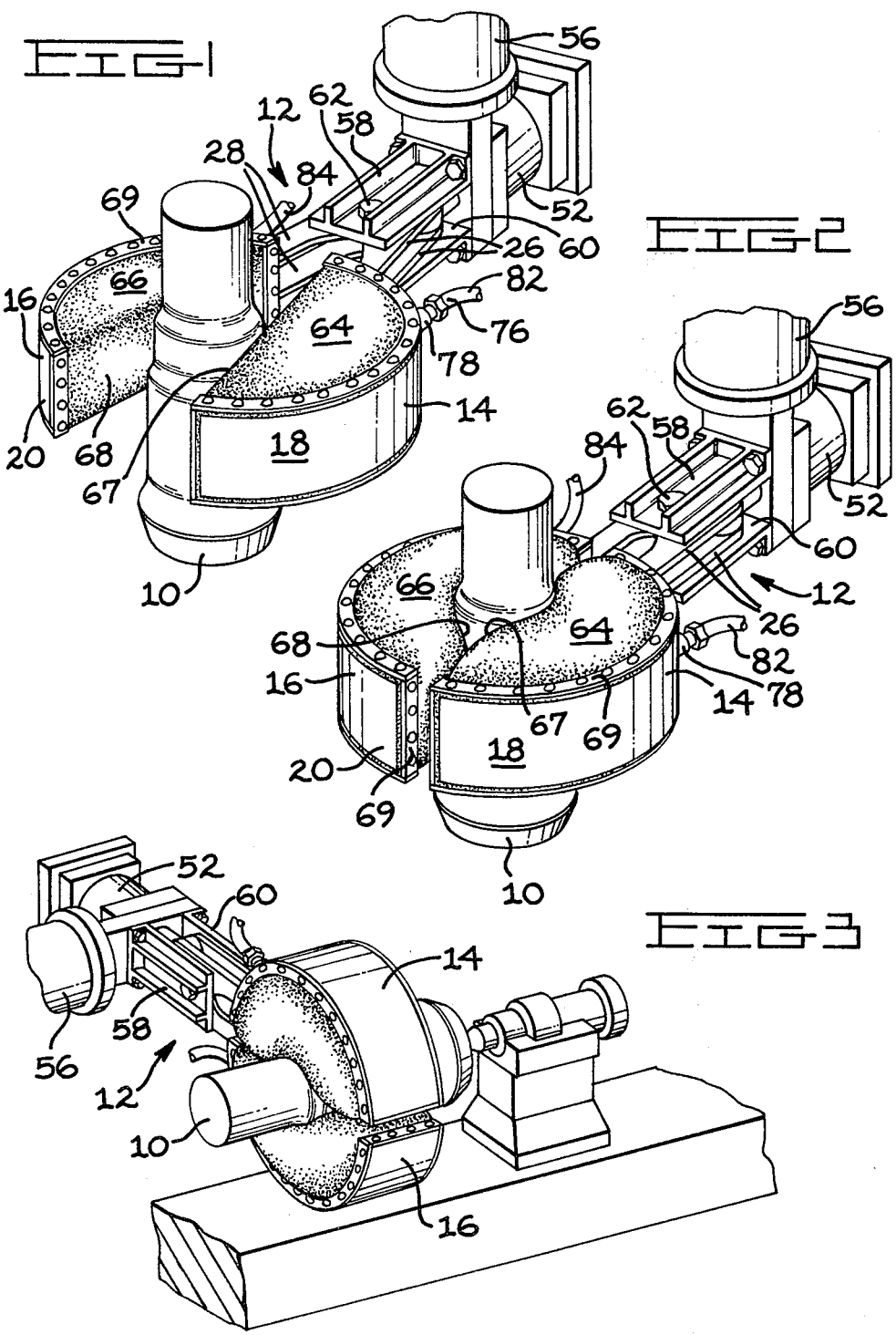

CLAMP ASSEMBLY

DESCRIPTION

1. Technical Field

This invention relates generally to a clamp assembly for controllably gripping an article and more particularly to such a clamp assembly having a pair of pressurizable gripping members.

2. Background Art

In the material handling industry, increased use is being made of automated handling equipment. In particular, robots are increasingly being used to transfer articles and to load and unload articles from machine tools. If all of the workpieces being handled are identical, a clamp assembly for holding the article during transfer can be easily designed. However, if a diversity of articles having varying sizes and shapes is presented to the handling device, the clamp assembly for holding the articles generally becomes more complex. Often sensing and control devices are required to adapt a clamp assembly to variously sized and shaped articles. Additionally, if the articles being handled are partially finished, care must be taken to prevent damage to previously finished surfaces or features of the article. This problem has, heretofore, resulted in adding to the complexity of the clamping or gripping assembly.

One approach to controllably gripping an article susceptible to damage is disclosed in U.S. Pat. No. 3,915,311 issued to Glen A. Ball, et al, on Oct. 25, 1975. In the Ball patent, a pressurizable inflatable bladder is mounted inside a ring for circumferentially gripping a large circular object such as a tire core. A somewhat similar device is also disclosed in U.S. Pat. No. 2,756,883 issued to Irvin F. Schreck on July 31, 1956. However, both of the above clamping devices are effective for clamping only a predetermined, specifically-sized article.

The present invention provides a simple, effective device for controllably gripping variously sized and shaped articles and is directed to overcoming one or more of the problems as set forth above.

DISCLOSURE OF THE INVENTION

In accordance with one aspect of the present invention, a clamp assembly is provided for controllably gripping an article. The clamp assembly includes a pair of pressurizable gripping members, that are mounted on a pair of opposed frame members, and movable between a position at which the frame members are spaced apart and a position at which they are substantially adjacent one another.

Clamp assemblies for use with automated material handling devices generally require a sensor or other data input to adapt the assembly to a configuration conducive for controllably gripping a randomly-presented article of indeterminate size or shape. The present invention simply and effectively solves this problem by providing plural pressurizable gripping members having compliant article-contacting surfaces. The gripping members are controllably pressurized to form the compliant surface at least partially about the article and apply a minimal, predetermined contact force on the article. The force applied is sufficient for safely lifting or moving the article, but is not of a magnitude to render damage to vulnerable features of the article. In addition, rigid non-compliant gripping surfaces are avoided, thereby eliminating any risk of marring or otherwise damaging previously finished surfaces on the article.

BRIEF DESCRIPTION OF THE DRAWINGS

FIG. 1 is an isometric view of an embodiment of the present invention with opposed members of the clamp assembly spaced apart.

FIG. 2 is an isometric view of an embodiment of the present invention with the opposed members adjacently disposed.

FIG. 3 is an isometric view of an embodiment of the present invention showing an article gripped between the opposed members being placed in a machine tool.

BEST MODE FOR CARRYING OUT THE INVENTION

Figure 4:
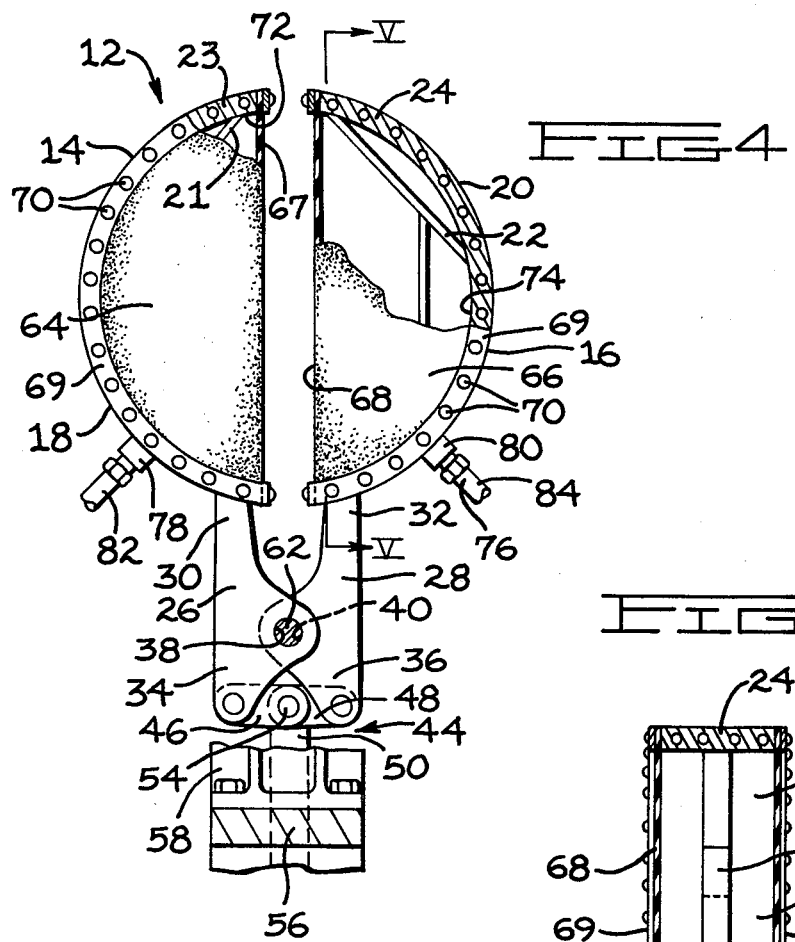
FIG. 4 is to top plan view of an embodiment of the present invention with sections broken away to show details of the frame members.
Figure 5:
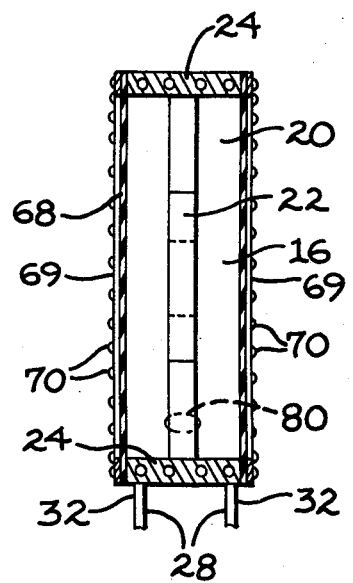
FIG. 5 is a sectional view of the present invention, taken along the line V—V of FIG. 4.

The preferred embodiment of a clamp assembly for controllably gripping an article 10 is generally indicated by the reference numeral 12. The clamp assembly 12 includes a first frame member 14 and a second frame member 16 opposedly mounted with respect to the first frame member. As best shown in FIGS. 4 and 5, each of the frame members have a semi-cylindrical rigid wall portion 18,20, a reinforcing brace 21,22 attached to the radially inner surface of the wall portions 18,20, a flange 23,24 extending about the periphery of the wall portions 18,20, and a pair of support arms 26,28. Each of the support arms include spaced upper and lower planar members and are respectively attached at a first end 30,32 to the semi-cylindrical wall portion 18,20. The support arms 26,28 also respectively have a second end 34,36 and a laterally-offset bore 38,40 projecting through each of the spaced planar members and being positioned intermediately of the respective first and second ends.

The clamp assembly 12 includes a first means 44 for moving the frame members 14,16 between a first position at which the frame members are spaced apart, as shown in FIG. 1, and a second position at which the frame members are adjacently disposed with respect to one another, as shown in FIG. 2. This means 44 for moving the frame members is attached to the second ends 34,36 of the support arms 26,28 and includes a pair of links 46,48 respectively pivotally connected at one end to the second links 34,36 and at an opposite end to one another and to a rod end 50 of a fluid actuated cylinder 52 by a pin 54.

The fluid operated cylinder 52, typically an air cylinder, is mounted onto the end of a controllably movable arm 56 such as the movable arm of a robot, not shown. The movable arm 56 includes a pair of spaced mounting brackets 58,60 having aligned bores extending through each of the brackets for receiving a pin 62. The pin 62 also extends through the bores 38,40 of the support arms 26,28 pivotally interconnecting the support arms at a position intermediate of the respective first ends 30,32 and the second ends 34,36.

The clamp assembly 12 also includes a first gripping member 64 attached to the first frame member 14 and a second gripping member 66 attached to the second frame member 16. The gripping members 64,66 respectively include a compliant article-contacting surface 67,68 and are constructed of a partially extensible impervious material such as neoprene rubber. The gripping members 64,66 are attached to the frame members 14,16 by a plurality of metallic retainer strips 69 and cap screws 70 extending serially through the retainer strips 69, the gripping members 64,66, and the peripheral flanges 23,24. The construction effectively clamps the compliant material of the gripping members 64,66 to the respective frame members 14,16 forming a substantially air-tight seal about the peripheral flanges 23,24. A pair of pressurizable chambers 72,74 are thus defined by the wall portions 18,20 of the frame members 14,16 and the gripping members 64,66. The compliant, article-contacting surfaces 67,68 of the gripping members 64,66 may have a textured pattern to improve contact and reduce slippage between the members 64,66 and an article 10.

A second means 76 for controllably pressurizing the gripping members includes a pair of ports 78,80 formed respectively in the wall portions 18,20 of the frame members 14,16, and supply lines 82,84 connected respectively at one end to the ports 78,80 and at a second end, not shown, to a controllable source of pressurized fluid. Typically, the controllable source of pressurized fluid includes a conventional directional flow control valve and an adjustable pressure regulator connected to an air compressor or shop air system.

In an alternative embodiment of the present invention, not shown, it may be desirable to have only one of the frame members movable between the first and second positions and the other frame member fixed with respect to the movable arm 56. Also, it is contemplated that one of the gripping members 64,66 may be prepressurized or otherwise filled with a fluid or foam material, with the other one of the gripping members 64,66 being pressurizable by the second means 76.

Industrial Applicability

In operation, the opposed frame members 14,16 of the clamp assembly 12 are moved to a first position at which the frame members are spaced apart by extending the rod end 50 of the fluid actuated cylinder 52. This action will cause the links 46,48 to pivot about the pin 54 and bring the second end 34,36 of the support arms 26,28 closer together. Since the support arms 26,28 are pivotally interconnected at a position intermediate the respective first ends 30,32 and the second ends 34,36, the arms 26,28 will pivot about the pin 62 and the attached frame members 14,16 will be spaced apart at a first position in response to bringing the second ends 26,28 closer together.

At the above-described first position, at least one, and preferably both, of the gripping members are unpressurized and the movable arm 56, preferably attached to a robot, is maneuvered to position the clamp assembly 12 about an article 10 as shown in FIG. 1.

The fluid-actuated cylinder is then actuated to retract the rod end 50 and, by the above-described pivot connections, move the second ends 34,36 of the support arms apart. The attached frame members 14,16 are moved to a second position at which the frame members are adjacently disposed as shown in FIG. 2. In response to moving the frame members 14,16 to the second position, the directional control valve, not shown, is shifted to direct a flow of pressurized air into the chambers 72,74 and pressurize the gripping members 64,66. Under pressure, the compliant, article-contacting surfaces 67,68 of the gripping members 64,66 are substantially formed to the shape of the article 12, and a generally uniform contact force is distributed over a broad area of the article 10.

After clamping, the movable arm is maneuvered as desired, to transfer the article 10 to a new position. As shown in FIG. 3, the article 10 may be placed on a machine tool for subsequent machining operations. After transfer, the directional control valve is shifted and pressure is released from the chambers 72,74 of the gripping members 64,66. The rod end 50 is again extended, and the frame members 14,16 are spaced apart in the aforementioned manner.

As may be easily recognized, the compliant surfaces 67,68 of the gripping members 64,66 is adaptable to receiving and conforming to a wide range of diversly sized and shaped articles. The present invention has been found to be particularly useful in handling a variety of stepped shafts having four or more different diameters at various positions on a single shaft. It has been found that shafts having a diameter ranging from about 0.01 m to 0.15 m (0.5 in. to 6.0 in.) and weighing in a range from about 0.45 kg to 40 kg (1 lb to 90 lb) could be efficiently and safely handled by the clamp assembly of the present invention. For the above shafts, it has been found that pressurizing the gripping members 64,66 to a pressure in the range of about 70 kPa to 210 kPa (10 psi to 30 psi) is sufficient to form the compliant surfaces 67,68 substantially about a shaft in the above range and provide the necessary contact force for lifting and transferring the shaft.

Other aspects, objects and advantages of this invention can be obtained from a study of the drawings, the disclosure and the appended claims.

I claim:
1. A clamp assembly (12) for controllably gripping an article, comprising:
   a pair of opposed frame members (14,16) each including a rigid wall portion (18,20) and a support arm (26,28), each of said support arms (26,28) having a first end (30,32) attached respectively to one of said rigid wall portions (18,20) and a second end (34,36) spaced from said first end (30,32), said support arms (26,28) being pivotally interconnected at a point intermediate said first (30,32) and second ends (34,36) and said frame members (14,16) being pivotally movable about said point between a first position at which the frame members (14,16) are spaced apart and a second position at which the frame members (14,16) are adjacently disposed with respect to one another;
   means (44) for pivotally moving said frame members (14,16) between said first and second positions;
   a pair of pressurizable gripping members (64,66), each having a compliant article-contacting surface (67,68) and being respectively attached to said frame members (14,16); and
   means (76) for controllably pressurizing at least one of said gripping members (64,66).

2. The clamp assembly (12), as set forth in claim 1, wherein said rigid wall portions (18,20) are arcuately shaped and each of the second ends (34,36) of said support arms (26,28) are attached to said means (44) for moving the frame members (14,16).

3. A clamp assembly (12) for controllably gripping an object (10), comprising:
   a first frame member (14);
   a second frame member (16);

a first gripping member (64) attached to said first frame member (14);

a second gripping member (66) attached to said second frame member (16);

first means (44) for moving at least one of said first frame member (14) and said second frame member (16) between a first position at which said first and second gripping members (64,66) are spaced apart and a second position at which said first and second gripping members (64,66) are in substantially abutting relationship;

a pair of support arms (26,28) each having a first end (30,32) attached to a respective one of said first and second members (14,16), and a second end (34,36) attached to said first means (44), said support arms (26,28) being pivotally interconnected at a point intermediate said first (30,32) and second ends (34,36) and being pivotally movable about said point between a first position at which the frame members (14,16) are spaced apart and a second position at which the frame members (14,16) are adjacently disposed with respect to one another; and second means (76) for pressurizing at least one of said first and second gripping members (64,66) in response to said first and second gripping members (64,66) being at said second position.

4. The clamp assembly (12), as set forth in claim 3, wherein said first and second frame members (14,16) each include a semi-cylindrical rigid wall portion (18,20), and said first and second gripping members (64,66) are attached to said respective rigid wall portion (18,20).

* * * * *